United States Patent
Hojo et al.

(10) Patent No.: US 10,480,428 B2
(45) Date of Patent: Nov. 19, 2019

(54) VALVE CONTROL DEVICE

(71) Applicants: KEIHIN CORPORATION, Tokyo (JP); HONDA MOTOR CO., LTD., Tokyo (JP)

(72) Inventors: Sachio Hojo, Shioya-gun (JP); Masatomo Yoshida, Shioya-gun (JP); Youichiro Shikine, Shioya-gun (JP); Kensuke Yamamoto, Utsunomiya (JP); Akihito Inoue, Nasukarasuyama (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 15/560,352

(22) PCT Filed: Mar. 24, 2016

(86) PCT No.: PCT/JP2016/059327
§ 371 (c)(1),
(2) Date: Sep. 21, 2017

(87) PCT Pub. No.: WO2016/152960
PCT Pub. Date: Sep. 29, 2016

(65) Prior Publication Data
US 2018/0073450 A1    Mar. 15, 2018

(30) Foreign Application Priority Data
Mar. 26, 2015    (JP) .................................. 2015-064627

(51) Int. Cl.
*F02D 41/00*    (2006.01)
*F02B 37/18*    (2006.01)
(Continued)

(52) U.S. Cl.
CPC .......... *F02D 41/0007* (2013.01); *F02B 37/18* (2013.01); *F02B 37/183* (2013.01);
(Continued)

(58) Field of Classification Search
CPC ............. F02D 41/0007; F02D 41/1401; F02D 2041/1422; F02D 2041/1409; F02B 39/16;
(Continued)

(56) References Cited

U.S. PATENT DOCUMENTS

| | | | | |
|---|---|---|---|---|
| 2009/0265076 A1* | 10/2009 | Hirose | ................... | F02D 11/106 701/103 |
| 2014/0341703 A1* | 11/2014 | Kokotovic | ............ | F02B 37/186 415/1 |
| 2016/0108800 A1* | 4/2016 | Wang | ................... | F02D 41/1401 60/602 |

FOREIGN PATENT DOCUMENTS

| | | |
|---|---|---|
| CN | 102042077 A | 5/2011 |
| JP | 60-259724 A | 12/1985 |

(Continued)

OTHER PUBLICATIONS

Japanese Office Action, Notice of Reasons for Rejection application No. 2017-508413 dated Oct. 9, 2018.
(Continued)

*Primary Examiner* — Ian G Paquette
(74) *Attorney, Agent, or Firm* — Squire Patton Boggs (US) LLP (57) ABSTRACT

A valve control device performs feedback control of a drive mechanism for a wastegate valve provided for a supercharger of an engine on the basis of a sensor signal indicating a real degree of opening of the wastegate valve and a target degree of opening of the wastegate valve, and includes a gain setting unit configured to set different control
(Continued)

gains when the wastegate valve is closed and when the wastegate valve is opened.

2 Claims, 4 Drawing Sheets

(51) Int. Cl.
    *F16K 31/04*     (2006.01)
    *F16K 37/00*     (2006.01)
    *F02D 41/14*     (2006.01)
    *F02B 39/16*     (2006.01)

(52) U.S. Cl.
    CPC .......... *F02B 39/16* (2013.01); *F02D 41/1401* (2013.01); *F16K 31/046* (2013.01); *F16K 37/0041* (2013.01); *F02D 2041/1409* (2013.01); *F02D 2041/1422* (2013.01); *Y02T 10/144* (2013.01)

(58) Field of Classification Search
    CPC ...... F02B 37/18; F02B 37/183; F16K 31/046; F16K 37/0041; Y02T 10/144
    See application file for complete search history.

(56) References Cited

FOREIGN PATENT DOCUMENTS

| | | |
|---|---|---|
| JP | 03-202634 A | 9/1991 |
| JP | 10-047135 A | 2/1998 |
| JP | 2002-217028 A | 8/2002 |
| JP | 2005-320937 A | 11/2005 |
| JP | 2006-274834 A | 10/2006 |
| JP | 2008-157086 A | 7/2008 |
| JP | 2010-007674 A | 1/2010 |
| JP | 2014-177886 A | 9/2014 |
| JP | 2015-040488 A | 3/2015 |
| JP | 10-047135 A | 2/2017 |
| WO | 2014/132544 A1 | 9/2014 |
| WO | 2014/208361 A1 | 12/2014 |

OTHER PUBLICATIONS

International Search Report & Written Opinion dated May 31, 2016 corresponding to International Patent Application No. PCT/JP2016/059327, and English translation thereof.
Chinese Office Action Search Report Chinese Application No. 201680016791.4 dated Jan. 2, 2019.
Japanese Notice of Allowance Application No. 2017-508413 dated Jan. 15, 2019.

* cited by examiner

VALVE CONTROL DEVICE

TECHNICAL FIELD

The present invention relates to a valve control device and a valve system.

Priority is claimed on Japanese Patent Application No. 2015-064627, filed on Mar. 26, 2015, the content of which is incorporated herein by reference.

BACKGROUND ART

A supercharging pressure control device of an internal combustion engine which correctly learns a reference position of a wastegate valve to properly control a supercharging pressure is disclosed in Patent Literature 1 below. The supercharging pressure control device calculates a degree-of-opening correction amount of the wastegate valve on the basis of a deviation between a target supercharging pressure and a real supercharging pressure, calculates a fully closed learning value of the wastegate valve on the basis of the degree-of-opening correction amount on condition of post-completion of warmup of the engine, calculates a target degree of opening of the wastegate valve on the basis of the degree-of-opening correction amount, the fully closed learning value, and a base degree of opening of the wastegate valve, and has feedback control of a WGV actuator for driving the wastegate valve on the basis of the target degree of opening and a real degree of opening of the wastegate valve.

A supercharging pressure control device of a supercharger-equipped engine is disclosed in Patent Literature 2 below. The supercharging pressure control device controls a control gain of feedback to be large during a transition and to be small at a steady time.

CITATION LIST

Patent Literature

Patent Literature 1

Japanese Unexamined Patent Application, First Publication No. 2006-274834

Patent Literature 2

Japanese Unexamined Patent Application, First Publication No. S60-259724

SUMMARY OF INVENTION

Technical Problem

Meanwhile, in the related art, the fully closed learning value of the wastegate valve is acquired on condition of the post-completion of warmup of the engine, and thereby a reference position (a fully closed position) of the wastegate valve is accurately obtained. However, followability of the real degree of opening of the wastegate valve for the target degree of opening is affected by a pressure of exhaust gas of the engine to which the wastegate valve is exposed.

An aspect of the present invention was made in view of the above circumstances, and an object thereof is to provide a valve control device capable of maintaining followability in the control of a wastegate valve even under the influence of an exhaust gas pressure.

Solution to Problem

To solve the above technical problems to achieve the related object, the present invention adopts the following aspects.

(1) A valve control device of an aspect according to the present invention performs feedback control of a drive mechanism for a wastegate valve provided for a supercharger of an engine on the basis of a sensor signal indicating a real degree of opening of the wastegate valve and a target degree of opening of the wastegate valve, and includes a gain setting unit configured to set different control gains when the wastegate valve is closed and when the wastegate valve is opened.

(2) In the aspect according to (1) above, the gain setting unit may set the control gain to be relatively large when the wastegate valve is closed, and may set the control gain to be relatively small when the wastegate valve is opened.

(3) In the aspect according to (2) above, the gain setting unit may set the control gain to be higher in a transitional section of the target degree of opening when the wastegate valve is closed than in a steady section of the target degree of opening.

(4) In the aspect according to (2) or (3) above, the gain setting unit may set the control gain to be higher in a transitional section of the target degree of opening when the wastegate valve is opened than in a steady section of the target degree of opening.

(5) In the aspect according to (3) or (4) above, the gain setting unit may determine the steady section and the transitional section in the target degree of opening on the basis of at least one of a deviation between the target degree of opening of the wastegate valve and the real degree of opening thereof and a differential value of the target degree of opening of the wastegate valve, and a differential value of the real degree of opening of the wastegate valve.

Advantageous Effects of Invention

According to the aspects of the present invention, a valve control device capable of maintaining followability in control of the wastegate valve even under an influence of a pressure of exhaust gas by setting the different control gains when the wastegate valve is closed and when the wastegate valve is opened can be provided.

DESCRIPTION OF EMBODIMENTS

Hereinafter, an embodiment of the present invention will be described with reference to the drawings.

Figure 1:
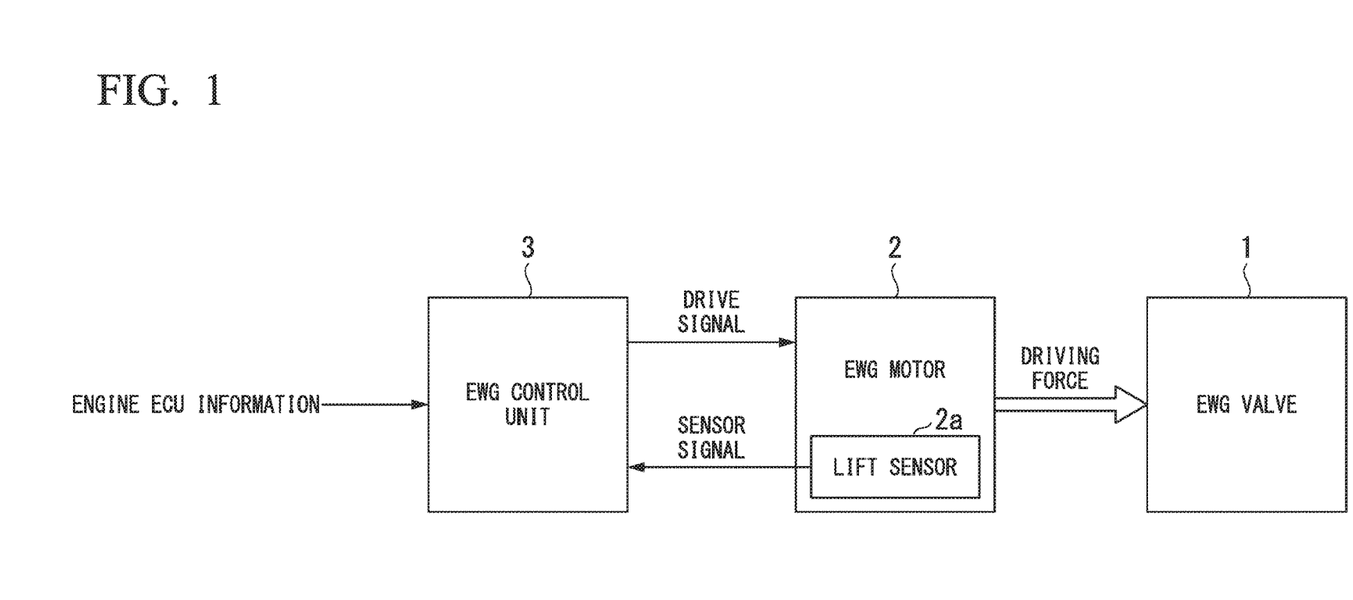
FIG. 1 is a block diagram illustrating a functional constitution of a valve system according to an embodiment of the present invention.

A valve system and valve control device according to the present embodiment include, as illustrated in FIG. 1, an EWG valve 1, an EWG motor 2, and an EWG control unit 3. In the present embodiment, "EWG" is short for "electric waste gate."

The EWG valve 1 is a wastegate valve that is provided on a bypass passage for engine exhaust gas in a supercharger, and adjusts a supercharging pressure of combustion air supplied to an engine. That is, when a degree of opening of the EWG valve 1 is increased, the supercharging pressure is reduced. In contrast, when the degree of opening of the EWG valve 1 is reduced, the supercharging pressure is increased. This EWG valve 1 is mechanically connected to the EWG motor 2 via a predetermined coupling mechanism, and the degree of opening thereof is adjusted (operated) by a driving force of the EWG motor 2. The supercharger is an auxiliary machine of the engine as well-known, and adjusts the supercharging pressure of the combustion air supplied to the engine in cooperation with the wastegate valve.

Here, the degree of opening of the EWG valve 1 is a physical amount regulated by a position (a lift amount) of a valve body relative to a valve seat in the EWG valve 1. That is, when the lift amount is increased, that is, when the distance of the valve body from the valve seat is increased, the degree of opening of the EWG valve 1 is increased. In contrast, when the lift amount is reduced, that is, when the distance of the valve body from the valve seat is reduced, the degree of opening of the EWG valve 1 is reduced.

The EWG motor 2 is an actuator that drives the EWG valve 1, for instance, a direct current motor. The EWG motor 2 includes a lift sensor 2a that outputs a voltage indicating the lift amount of the EWG valve 1 as a sensor signal (a voltage signal). This EWG motor 2 is operated on the basis of a drive signal input from the EWG control unit 3, and operates the degree of opening of the EWG valve 1. The EWG motor 2 constitutes a drive mechanism in the present embodiment along with the above coupling mechanism. The sensor signal is a degree-of-opening signal indicating a real degree of opening (a real lift amount) of the EWG valve 1 (the wastegate valve).

The EWG control unit 3 is a valve control device in the present embodiment, and adjusts the degree of opening of the EWG valve 1 by controlling the EWG motor 2. The EWG control unit 3 is one control functional element in an engine ECU, acquires the sensor signal from the lift sensor 2a, and acquires a variety of information (engine ECU information) from a master control functional element constituting a master control system in the engine ECU. The EWG control unit 3 generates the drive signal on the basis of the engine ECU information and the sensor signal, and thereby controls the EWG motor 2. That is, the EWG control unit 3 is targeted at controlling the EWG valve 1, and adjusts the degree of opening (the lift amount) of the EWG valve 1 via the drive mechanism targeted at driving the EWG motor 2.

The engine ECU information is an instruction signal of the engine ECU provided outside the EWG control unit 3 or a signal that indicates an engine operating state, and is for instance a target lift amount, an IG ON signal, an engine water temperature signal, and water temperature sensor failure signal. This EWG control unit 3 has feedback control of the EWG motor 2 on the basis of the engine ECU information and the real lift amount in the EWG valve 1.

The target lift amount is a control target value indicating a degree-of-opening target of the EWG valve 1. The IG ON signal is a signal indicating an ON/OFF state of an ignition switch or a startup signal indicating a startup state of an engine. The engine water temperature signal is a signal indicating an engine coolant temperature detected by a water temperature sensor provided for the engine. Further, a failure of the water temperature sensor is a signal indicating that the water temperature sensor has failed.

Figure 2:
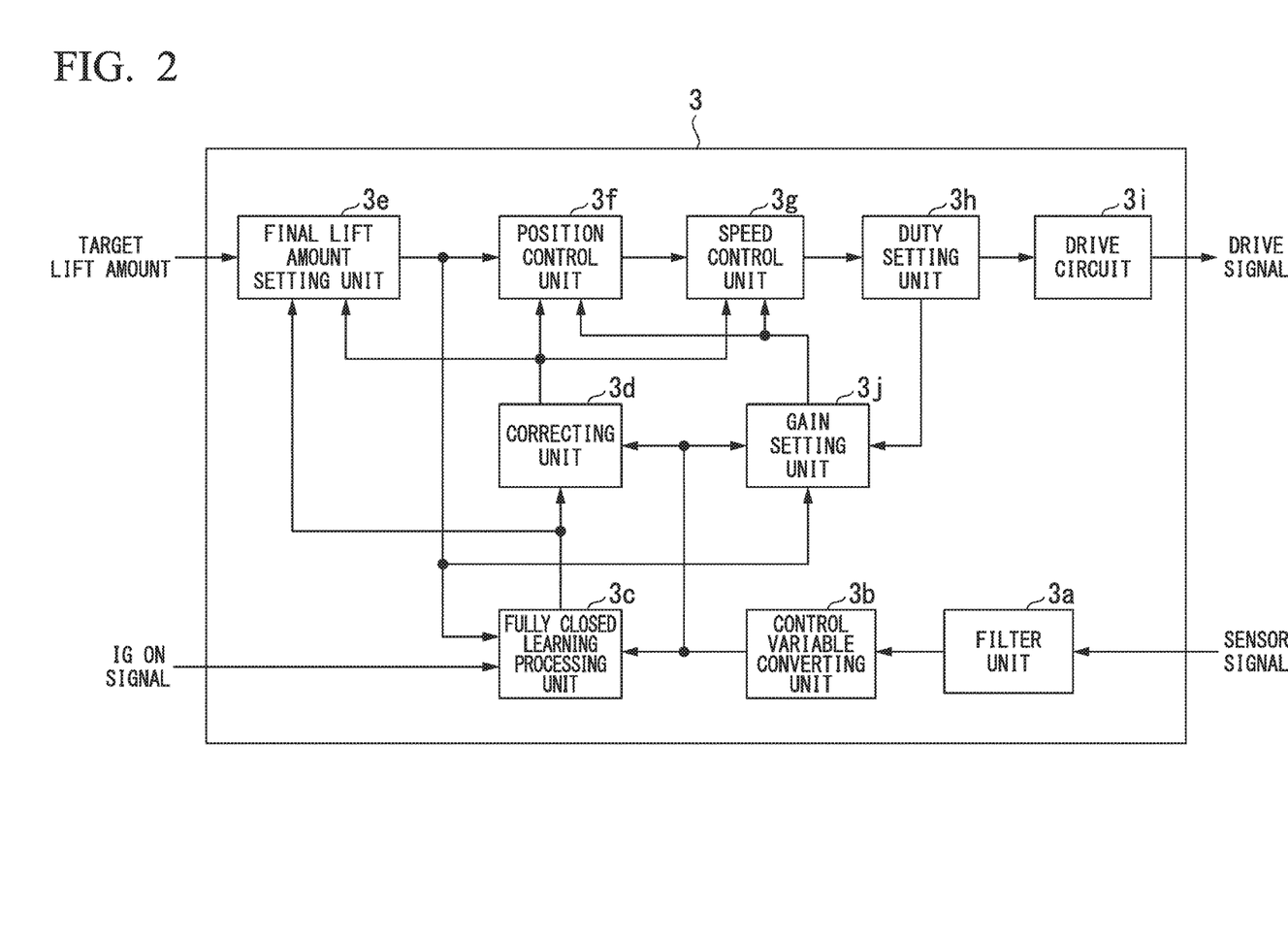
FIG. 2 is a block diagram illustrating a functional constitution of a valve control device according to the embodiment of the present invention.

As illustrated in FIG. 2, this EWG control unit 3 includes a filter unit 3a, a control variable converting unit 3b, a fully closed learning processing unit 3c, a correcting unit 3d, a final lift amount setting unit 3e, a position control unit 3f, a speed control unit 3g, a DUTY setting unit 3h, a drive circuit 3i, and a gain setting unit 3j. Note that the "DUTY" is a term indicating a duty ratio.

The filter unit 3a converts a sensor signal or an analog voltage signal, which is input from the lift sensor 2a, into a digital signal (detected voltage data), performs median filtering (digital signal processing) on the digital signal, and outputs the result to the control variable converting unit 3b. The median filtering is filtering used to remove noise by extracting a medium value (a median) of each predetermined amount of data with respect to detected voltage data that is time series data. The lift sensor 2a outputting the sensor signal makes it easy for various kinds of noise to overlap because it is provided for the EWG motor 2 attached to the engine, but the filter unit 3a outputs the detected voltage data, which more accurately indicates the real lift amount (the real degree of opening) by removing this noise, to the control variable converting unit 3b.

Here, moving average processing is generally used in the digital signal processing for removing the noise. However, since the median filtering has higher noise removal performance than the moving average processing, the filter unit 3a adopts the median filtering. In the present embodiment, the speed control unit 3g is provided in addition to the position control unit 3f. However, the speed control unit 3g calculates a speed control variable using a differential value of the real lift amount, and thus is easily affected by noise overlapping the real lift amount. In the present embodiment, since this speed control unit 3g is provided, the median filtering is adopted instead of the moving average processing.

The control variable converting unit 3b converts the detected voltage data (the voltage amount) into the real lift amount. The control variable converting unit 3b has, for instance, a conversion table showing a relationship between the detected voltage data (the voltage amount) and the real lift amount (the position), extracts the real lift amount equivalent to the detected voltage data on the basis of the conversion table, and outputs the extracted lift amount to the fully closed learning processing unit 3c. In place of the conversion table, a conversion formula showing the relationship between the detected voltage data and the real lift amount may be pre-stored, and the real lift amount equivalent to the detected voltage data may be extracted on the basis of the conversion formula.

The fully closed learning processing unit 3c is a functional component that learns the real lift amount (the seated position) as a fully closed lift amount when the valve body of the EWG valve 1 is seated on the valve seat. The fully closed lift amount varies depending on a temperature of the EWG valve 1, and thus cannot be treated as a fixed value. Due to these circumstances, the fully closed learning processing unit 3c learns the real lift amount (the seated position) as the fully closed lift amount when the valve body of the EWG valve 1 is seated on the valve seat on the basis of the IG ON signal, and the real lift amount input from the control variable converting unit 3b.

Here, the fully closed lift amount includes a long-term learning value and a short-term learning value. The long-term learning value is a learning value acquired whenever the engine is started, whereas the short-term learning value is a learning value acquired whenever the valve body is seated. That is, when it is determined on the basis of the IG ON signal that the engine is started, the fully closed learning processing unit 3c stores the fully closed lift amount when the valve body of the EWG valve 1 is seated first after the engine is started as the long-term learning value. On the other hand, whenever the valve body of the EWG valve 1 is seated on the valve seat, the fully closed learning processing unit 3c stores the fully closed lift amount at that time as the short-term learning value regardless of the starting of the engine.

The fully closed learning processing unit 3c also uses the IG ON signal indicating the starting of the engine in addition to the real lift amount input from the control variable converting unit 3b, thereby acquiring the long-term learning value, and acquires the short-term learning value on the basis of only the real lift amount input from the control variable converting unit 3b. This fully closed learning processing unit 3c outputs the long-term and short-term learning values to the final lift amount setting unit 3e, and outputs only the short-term learning value to the correcting unit 3d.

The correcting unit 3d is a functional component that compensates for the real lift amount input from the control variable converting unit 3b on the basis of the short-term learning value input from the fully closed learning processing unit 3c. That is, the correcting unit 3d takes a difference between the real lift amount and the short-term learning value, and thereby calculates a lift amount (a correction lift amount) based on the short-term learning value and outputs the correction lift amount to the position control unit 3f and the speed control unit 3g.

The final lift amount setting unit 3e sets a final target lift amount (a control target value) on the basis of the target lift amount input as a piece of engine ECU information from the engine ECU, the long-term and short-term learning values input from the fully closed learning processing unit 3c, and the correction lift amount input from the correcting unit 3d. The target lift amount is a signal designating the lift amount (the degree of opening) of the EWG valve 1 as a square-wave voltage value. With respect to this target lift amount, the final lift amount setting unit 3e performs specific processing on the target lift amount when the valve body of the EWG valve 1 is seated on the valve seat, thereby generating the final target lift amount with which the valve body can make a soft landing on the valve seat.

That is, the final lift amount setting unit 3e divides a period required until the valve body is seated after initiating movement (downward movement relative to the valve seat) for the seating of the valve body into two periods, a former period and a latter period, and generates the final target lift amount with which the valve body makes a soft landing on the valve seat by moving the valve body downward at the highest speed in the former period and moving the valve body relatively gently in the latter period. The final lift amount setting unit 3e sets a switching point (a soft landing initiation lift amount) between the former and latter periods and a final stop target lift amount of the valve body on the basis of the long-term learning value and the short-term learning value.

The position control unit 3f generates a position operation amount and outputs it to the speed control unit 3g. That is, the position control unit 3f performs well-known PID processing on a difference between the final target lift amount (the control target value) input from the final lift amount setting unit 3e and the correction lift amount (a control variable) input from the correcting unit 3d, thereby generating the position operation amount. A control gain of the PID processing in the position control unit 3f is set by the gain setting unit 3j.

The speed control unit 3g generates a speed operation amount on the basis of the position operation amount input from the position control unit 3f and the correction lift amount input from the correcting unit 3d, and outputs the speed operation amount to the DUTY setting unit 3h. That is, the speed control unit 3g performs limiter processing on the position operation amount input from the position control unit 3f, and performs differential processing on the correction lift amount input from the correcting unit 3d. The speed control unit 3g performs well-known PID processing on a difference between the position operation amount after the limiter processing and a lift speed obtained by the differential processing, thereby generating the speed operation amount. A control gain of the PID processing in the speed control unit 3g is also set by the gain setting unit 3j in the same way as the control gain in the position control unit 3f.

The DUTY setting unit 3h and the drive circuit 3i will be described. For convenience, the drive circuit 3i will be described first. The drive circuit 3i is a motor drive circuit having a pulse drive system. That is, the drive circuit 3i converts direct current power into pulse width modulation (PWM) power on the basis of a PWM signal input from the DUTY setting unit 3h as a control signal, and outputs the PWM power to the EWG motor 2 as a drive signal.

On the other hand, the DUTY setting unit 3h is a PWM signal generator for generating the PWM signal on the basis of the speed operation amount input from the speed control unit 3g. The DUTY setting unit 3h has a function (as a DUTY limiter) of performing the limiter processing on the speed operation amount. That is, the DUTY setting unit 3h fixes the duty ratio (DUTY), an upper limit of which is limited and which is appropriate for the speed operation amount, on the basis of the speed operation amount and the DUTY limiter, and generates the PWM signal corresponding to the duty ratio.

Here, the duty ratio has a maximum value (an upper limit) of, for instance, 100%, and is a bipolar amount in which a rotational direction (a first rotational direction) of the EWG motor 2 when the EWG valve 1 is closed assumes positive polarity and a rotational direction (a second rotational direction) of the EWG motor 2 when the EWG valve 1 is opened assumes negative polarity. That is, the duty ratio is an amount that varies within a range of ±100% depending on the speed operation amount. The DUTY setting unit 3h outputs this duty ratio to the gain setting unit 3j.

The gain setting unit 3j is a functional component that sets control gains for the position control unit 3f and the speed control unit 3g on the basis of the final target lift amount input from the final lift amount setting unit 3e, the real lift amount input from the control variable converting unit 3b, and the duty ratio (DUTY) input from the DUTY setting unit 3h.

The gain setting unit 3j sets a relatively large control gain (a first control gain) for a transitional section in which the lift amount (the degree of opening) of the EWG valve 1 is changed relatively rapidly, and sets a relatively small control gain (a second control gain) for a steady section in which a change in the lift amount (the degree of opening) of the EWG valve 1 is relatively gentle. The gain setting unit 3j sets different control gains when the EWG valve 1 is closed and when the EWG valve 1 is opened. Details of gain selection processing in the gain setting unit 3j will be described in the following operation description.

Figure 3:
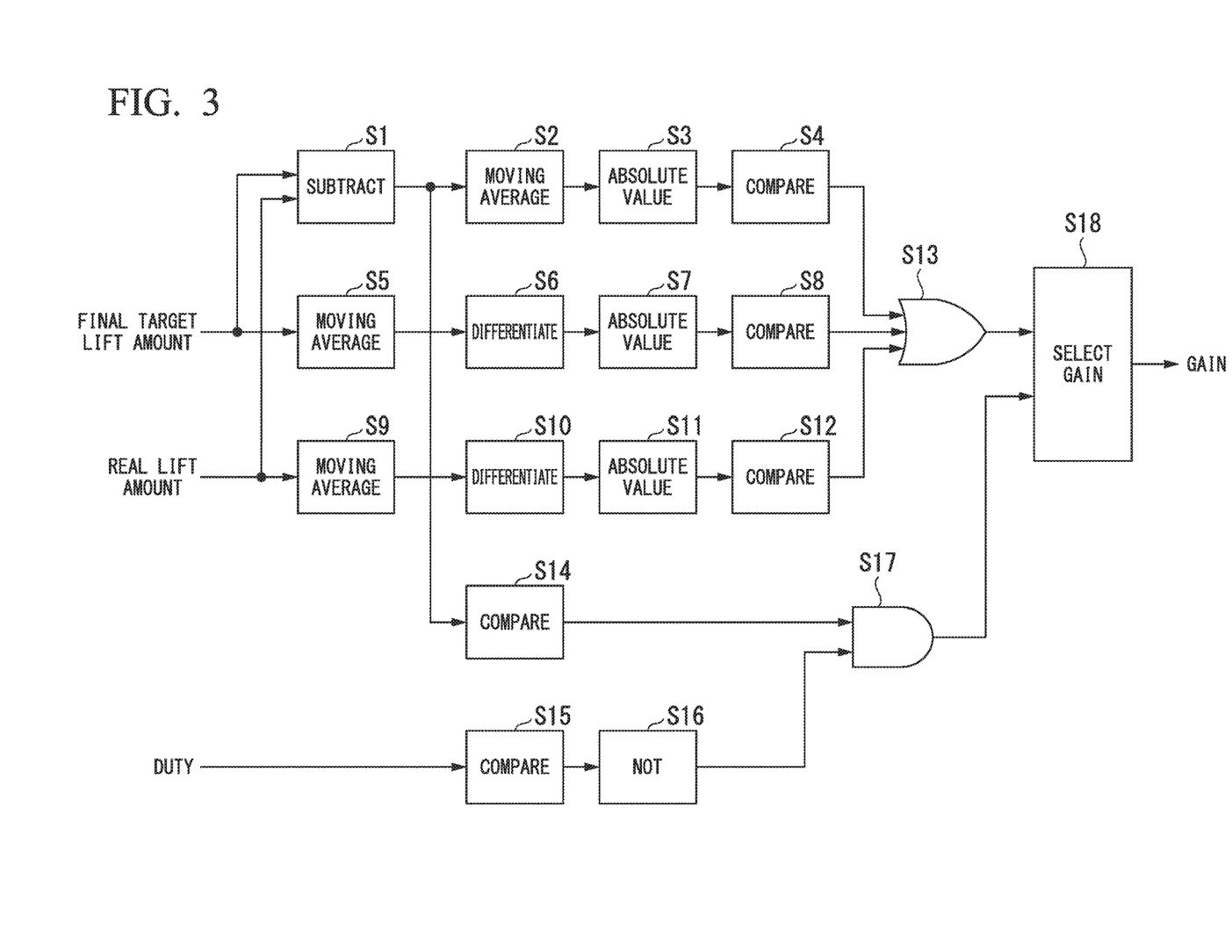
FIG. 3 is a processing system diagram illustrating a gain setting process in the embodiment of the present invention.

Next, operations of the valve system and the valve control device configured in this way will be described in detail with further reference to FIGS. 3 and 4.

The EWG control unit 3 (the valve control device) in the present embodiment is configured to generate the drive signal (the operation amount) on the basis of the target lift amount (the control target value) and the sensor signal (the control amount) as a basic operation. That is, the EWG control unit 3 performs feedback control on the EWG motor 2 on the basis of the target lift amount and the sensor signal. As a result of the feedback control, the degree of opening of the EWG valve 1 mechanically connected to the EWG motor 2 is adjusted according to the target lift amount.

The final lift amount setting unit 3e sets a final target lift amount for normal driving on the basis of the target lift amount input from the engine ECU (the master control system), the long-term and short-term learning values input from the fully closed learning processing unit 3c, and the correction lift amount input from the correcting unit 3d. That is, the final lift amount setting unit 3e uses the long-term learning value and the short-term learning value with respect to the target lift amount that is the square-wave voltage value, so that a falling section when the EWG valve 1 is fully closed and a low level section in which a lift amount at the time of full closure is designated are corrected, and thereby generates the final target lift amount.

To be more specific, the final lift amount setting unit 3e sets an initiation lift amount (a soft landing initiation lift amount Lk) and a stop target lift amount Lt when the valve body of the EWG valve 1 is soft-landed on the valve seat on the basis of a long-term learning value, a short-term learning value, and a defined value (a constant) as follows.

$Lk$=Long-term learning value−Short-term learning value+Defined value $Lk$=Long-term learning value−Short-term learning value−Defined value The final lift amount setting unit 3e monitors correction lift amounts that are input from the correcting unit 3d in turn, and outputs a control target value reaching the stop target lift amount Lt at a predetermined slope (speed) when the correction lift amount is consistent with the soft landing initiation lift amount Lk.

Here, the soft landing initiation lift amount Lk and the stop target lift amount Lt are defined by the long-term learning value, the short-term learning value, and the defined value (the constant). However, since the correction lift amount is given as the difference between the real lift amount and the short-term learning value as described above, the soft landing initiation lift amount Lk and the stop target lift amount Lt are amounts that are substantially defined only by the long-term learning value and the defined value (constant). When the final lift amount setting unit 3e is configured to introduce the real lift amount rather than the correction lift amount, the soft landing initiation lift amount Lk becomes (Long-term learning value+Defined value), and the stop target lift amount Lt becomes (Long-term learning value−Defined value). The soft landing initiation lift amount Lk and the stop target lift amount Lt are defined only by the long-term learning value and the defined value (the constant).

On the other hand, the filter unit 3a sequentially samples sensor signals (analog signals) input from the lift sensor 2a, converts the results into detected voltage data (digital signals), and performs median filtering on the detected voltage data. Since a noise component derived from the sensor signal overlapping the detected voltage data is removed by the median filtering, the detected voltage data becomes a signal that more accurately indicates the lift amount. The detected voltage data (the voltage) from which noise is removed by the median filtering is converted into the lift amount in the control variable converting unit 3b, and is output to the fully closed learning processing unit 3c, the correcting unit 3d, and the gain setting unit 3j.

Among the real lift amounts that are sequentially input from the control variable converting unit 3b whenever the engine is started using the IG ON signal input from the engine ECU as a trigger signal, the lift amount when the valve body of the EWG valve 1 is seated on the valve seat is learned as the long-term learning value by the fully closed learning processing unit 3c. That is, the fully closed learning processing unit 3c determines, on the basis of the IG ON signal, that the engine is started, and acquires and updates the fully closed lift amount whenever the valve body of the EWG valve 1 is seated on the valve seat as the short-term learning value.

The fully closed learning processing unit 3c stores the long-term learning value when the engine is stopped in a non-volatile memory, and then outputs the stored long-term learning value as an initial value of the short-term learning value when the engine is started.

The long-term learning value of the long-term and short-term learning values acquired by this learning process is provided to the final lift amount setting unit 3e, and is used to generate the above final target lift amount, while the short-term learning value is supplied to the correcting unit 3d. In the correcting unit 3d, the short-term learning value is subtracted from the real lift amount, and the correction lift amount is generated.

The position control unit 3f generates a position operation amount on the basis of a difference between the final target lift amount and the correction lift amount and output the result to the speed control unit 3g. The speed control unit 3g generates a speed operation amount on the basis of a difference between the position operation amount and the correction lift amount. The DUTY setting unit 3h generates a PWM signal for which a duty ratio is set depending on the speed operation amount, and outputs the result to the drive circuit 3i. The drive circuit 3i generates a drive signal having a wave height value appropriate for the PWM signal to drive the EWG motor 2. A speed limiter is set for the speed control unit 3g, and a DUTY limiter is set for the DUTY setting unit 3h. Thus, the highest rotational speed of the EWG motor 2 is reliably limited within an allowable range.

The basic operation of the EWG control unit 3 (the valve control device) has been described, but a control gain (a position control gain) used when the position control unit 3f generates the position operation amount and a control gain (a speed control gain) used when the speed control unit 3g generates the speed operation amount are set by the gain setting unit 3j as follows.

That is, the gain setting unit 3j calculates a target-actual deviation by subtracting the final target lift amount input from the final lift amount setting unit 3e and the real lift amount input from the control variable converting unit 3b (step S1). The gain setting unit 3j removes noise by performing moving average processing on the target-actual deviation (step S2), and further calculates an absolute value of the target-actual deviation by performing absolute value processing (step S3). Further, the gain setting unit 3j compares the absolute value of the target-actual deviation with a predetermined deviation threshold (a first deviation threshold), and thereby determines a transitional section and a steady section of the final target lift amount (step S4).

Here, a hysteresis is set in the comparison processing S4. That is, a first deviation threshold when a logic value of the comparison processing S4 transitions from "0" to "1" is set to a value different from a first deviation threshold when the logic value transitions from "1" to "0." This setting of the hysteresis is for inhibiting the logic value of the comparison processing S4 from being changed by a variation of the absolute value of the target-actual deviation in a case where the absolute value of the target-actual deviation is close to the first deviation threshold.

Figure 4A:
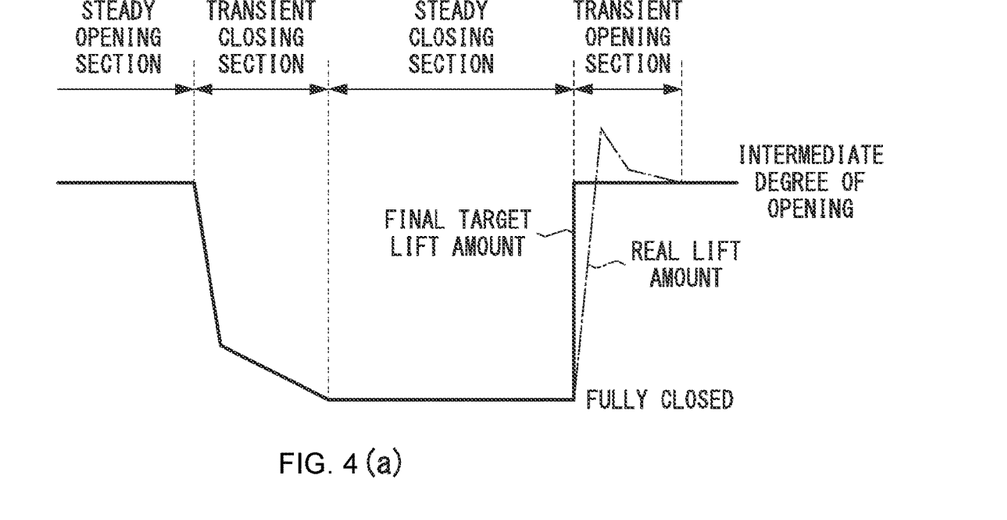
FIGS. 4(a) and 4(b) are timing charts illustrating the gain setting process in the embodiment of the present invention.
Figure 4B:
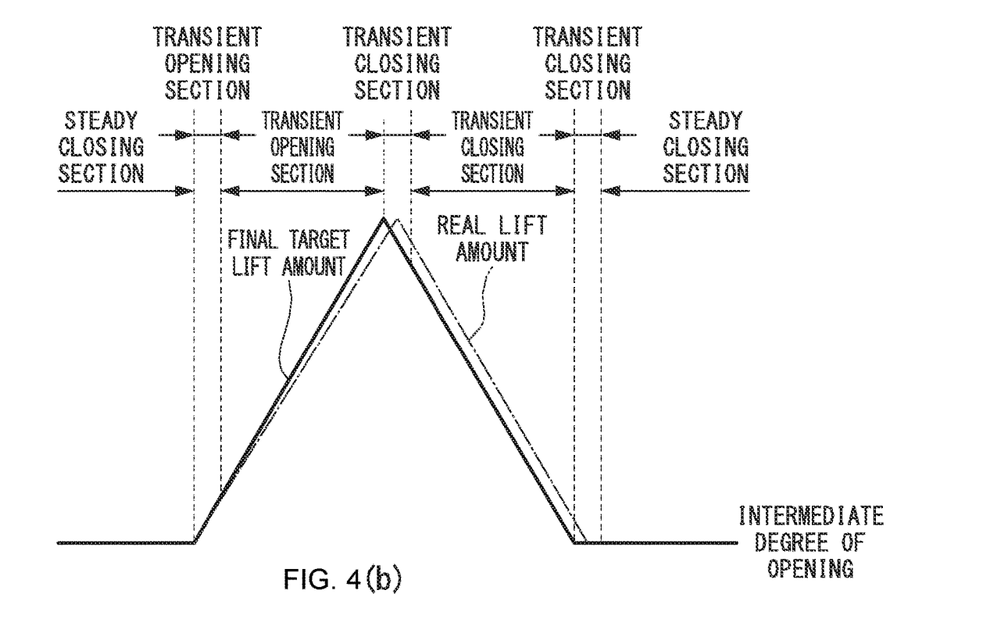

As illustrated in FIGS. 4(a) and 4(b), the transitional section is a portion in which the lift amount (the degree of opening) of the EWG valve 1 is relatively rapidly changed at the final target lift amount, and the steady section is a portion in which a change in the lift amount (the degree of opening) of the EWG valve 1 is relatively gentle. The gain setting unit 3j determines that the final target lift amount is the steady section when the absolute value of the target-actual deviation is less than or equal to the first deviation threshold, and determines that the final target lift amount is the transitional section when the absolute value of the target-actual deviation is greater than the first deviation threshold.

That is, a control deviation is relatively small in the steady section, but the control deviation is relatively large in the transitional section because a control delay or overshoot occurs easily. In view of control characteristics in this feedback control, the gain setting unit 3j identifies the steady section and the transitional section using the absolute value of the target-actual deviation.

The gain setting unit 3j performs the moving average processing on the final target lift amount to thereby acquire an average value of the final target lift amount (step S5), performs differential processing on the average value to thereby acquire a variation (a target variation) of the final target lift amount (step S6), and further performs the absolute value processing to thereby calculate an absolute value of the target variation (step S7). The gain setting unit 3j compares the absolute value of the target variation with a predetermined target variation threshold, and thereby determines that the target variation is large or small (step S8). The hysteresis set in the same way in the comparison processing S8 as in the above comparison processing S4.

That is, the gain setting unit 3j determines that the target variation is a relatively small value when the absolute value of the target variation is less than or equal to the target variation threshold, and determines that the target variation is a relatively large value when the absolute value of the target variation is larger than the target variation threshold. A state in which the absolute value of the target variation is less than or equal to the target variation threshold is a state in which the change of the final target lift amount is relatively small, that is, a state of the above steady section. A state in which the absolute value of the target variation is larger than the target variation threshold is a state in which the change of the final target lift amount is relatively large, that is, a state of the above transitional section.

Further, the gain setting unit 3j also performs the moving average processing on the real lift amount to thereby acquire an average value of the real lift amount (step S9), performs differential processing on the average value to thereby acquire a variation (a real variation) (step S10), and further performs the absolute value processing to thereby calculate the absolute value of the real variation (step S11). The gain setting unit 3j compares the absolute value of the real variation with a predetermined real variation threshold, and thereby determines that the real variation is large or small (step S12). The hysteresis is set in the same way in the comparison processing S12 as in the above comparison processes S4 and S8.

That is, the gain setting unit 3j determines that the real variation is a relatively small value when the absolute value of the real variation is less than or equal to the real variation threshold, and determines that the real variation is a relatively large value when the absolute value of the real variation is larger than the real variation threshold. A state in which the absolute value of the real variation is less than or equal to the real variation threshold is a state in which the change of the real lift amount is relatively small, that is, a state of the above steady section. A state in which the absolute value of the real variation is larger than the real variation threshold is a state in which the change of the real lift amount is relatively large, that is, a state of the above transitional section.

A steady state (the steady section of the final target lift amount) and a transitional state (the transitional section of the final target lift amount) in the feedback control of the EWG motor 2 are identified by any of the three comparison processes S4, S8 and S12 above. For example, all the logic values of the three comparison processes S4, S8 and S12 are "0" in the case of the steady state, and become "1" in the case of the transitional state. The gain setting unit 3j performs OR processing on these logic values of comparison processes S4, S8 and S12 (step S13).

The gain setting unit 3j compares the target-actual deviation with the second deviation threshold, and thereby determines a magnitude relationship between the final target lift amount and the real lift amount (step S14). A state in which the final target lift amount is greater than the real lift amount is equivalent to a case in which the degree of opening of the EWG valve 1 is increased (the EWG valve 1 is opened) as illustrated in FIGS. 4(a) and 4(b). A state in which the final target lift amount is smaller than or equal to the real lift amount is equivalent to a case in which the degree of opening of the EWG valve 1 is reduced (the EWG valve 1 is closed) as illustrated in FIGS. 4(a) and 4(b). That is, the state in which the EWG valve 1 is opened or closed is identified by the above comparison processing S14. An intermediate degree of opening in FIGS. 4(a) and 4(b) indicate a degree of opening between a degree of opening when the EWG valve 1 is fully closed and a degree of opening when the EWG valve 1 is fully opened.

Further, the gain setting unit 3j compares the duty ratio (DUTY) input from the DUTY setting unit 3h with the DUTY threshold to thereby evaluate polarity of the duty ratio (step S15), and performs negative logic processing on the logic value of the comparison processing (step S16). The duty ratio is positive polarity when the EWG valve 1 is closed, and negative polarity when the EWG valve 1 is opened as described above. The logic value of the comparison processing S15 leads to a result that a logic is inverted with respect to the logic value of the comparison processing S14. Therefore, the logic value of the negative logic processing S16 is matched with the logic value of the comparison processing S14 with respect to the opening/closing of the EWG valve 1.

The gain setting unit 3j performs AND processing on the logic value of the comparison processing S14 and the logic value of the negative logic processing S16 (step S17). The logic value of the AND processing S17 becomes "1" when it is determined on the basis of the target-actual deviation that the EWG valve 1 is in an opened state (when the logic value of the comparison processing S14 is "1") and when it is determined on the basis of the duty ratio (DUTY) that the EWG valve 1 is in an opened state (when the logic value of the negative logic processing S16 is "1"), and becomes "0" when the logic value of the comparison processing S14 and/or the negative logic processing S16 is "0."

The gain setting unit 3j performs gain selection processing on the position control gain and the speed control gain on the basis of the logic value of the OR processing S13 and the logic value of the AND processing S17 (step S18). That is, the gain setting unit 3j retrieves a control table (a 2-dimensional table) on the basis of a controlled state (a steady state or a transitional state) of the feedback control of the EWG motor 2 which the logic value of the OR processing S13 indicates and an operated state (an opened state or a closed state) of the EWG valve 1 which the logic value of the AND processing S17 indicates, that is, the four states, and thereby selects the position control gain and the speed control gain that are appropriate for the four states. When viewed with respect to the final target lift amount, the four states are equivalent to a steady opening section, a steady closing section, a transitional closing section, and a transitional opening section as illustrated in FIGS. 4(a) and 4(b).

In the case of the transitional state and the closed state (the transitional closing section) in the gain selection processing S18, the gain setting unit 3j sets a greatest position control gain and a greatest speed control gain because there is a need to make best followability of the real lift amount for the final target lift amount in the transitional state and because there is a need to resist an exhaust pressure of engine exhaust gas. When the EWG valve 1 is opened (in the case of the transitional opening section) in the transitional state, the gain setting unit 3j sets a position control gain and a speed control gain that are slightly smaller than the transitional closing section.

In the case of the steady state (in the steady opening section and the steady closing section), the gain setting unit 3j sets a smallest position control gain and a smallest speed control gain in order to emphasize stability of the real lift amount (the degree of opening), that is, to suppress microscopic fluctuation of the real lift amount (the degree of opening) regardless of the operated state (the opened state or the closed state) of the EWG valve 1. Further, when the EWG valve 1 is closed (in the case of the steady closing section) in the case of the steady state, the gain setting unit 3j sets a position control gain and a speed control gain that are slightly greater than when the EWG valve 1 is opened (in the case of the steady opening section) in the case of the steady state.

According to the present embodiment, since the position control gain and the speed control gain that are set when the EWG valve 1 is opened are different from those set when the EWG valve 1 is closed, the followability of the real lift amount (the real degree of opening) of the EWG valve 1 for the final target lift amount (the target degree of opening) can be maintained even under the influence of the pressure of the exhaust gas.

According to the present embodiment, since the position control gain and the speed control gain that are set when the EWG valve 1 is closed are greater than those set when the EWG valve 1 is opened, the followability of the real lift amount (the real degree of opening) for the final target lift amount (the target degree of opening) when the EWG valve 1 is opened/closed can be maintained even under the influence of the pressure of the exhaust gas.

According to the present embodiment, since the position control gain and the speed control gain in the transitional state (the transitional section) are set to be higher compared to those in the steady state (the steady section), the followability of the real lift amount (the real degree of opening) for the final target lift amount (the target degree of opening) when the EWG valve 1 is opened/closed can be maintained even under the influence of the pressure of the exhaust gas.

According to the present embodiment, when the EWG valve 1 is opened, the position control gain and the speed control gain in the transitional state (the transitional section) are set to be higher than those in the steady state (the steady section). Thus, the followability of the real lift amount (the real degree of opening) of the EWG valve 1 for the final target lift amount (the target degree of opening) can be maintained even under the influence of the pressure of the exhaust gas.

According to the present embodiment, the logic values of the three comparison processes S4, S8 and S12 are subjected to the OR processing S13, and thereby the transitional state (the transitional section) and the steady state (the steady section) are identified. Thus, in comparison with a case in which any one or two of the comparison processes S4, S8 and S12 are used, the transitional state and the steady state can be accurately identified. When any one of the comparison processes S4, S8 and S12 is used, using the comparison processing S4, that is, identifying the transitional state and the steady state on the basis of the final target lift amount and the real lift amount, is favorable from the viewpoint of reliability (stability). Further, when any two of the comparison processes S4, S8 and S12 are used, using the comparison processes S4 and S8 is favorable.

According to the present embodiment, the logic value of the comparison processing S14 and the logic value of the negative logic processing S16 are subjected to the AND processing S17, and thereby the state in which the EWG valve 1 is opened and the state in which the EWG valve 1 is closed are identified. Thus, in comparison with a case in which any one of the logic value of the comparison processing S14 or the logic value of the negative logic processing S16 is used, the state in which the EWG valve 1 is opened and the state in which the EWG valve 1 is closed can be accurately identified. When any one of the logic value of the comparison processing S14 or the logic value of the negative logic processing S16 is used, using the logic value of the negative logic processing S16, that is, adopting the duty ratio (the DUTY) calculated by the DUTY setting unit 3h is favorable from the viewpoint of reliability (stability).

According to the present embodiment, since the hysteresis is set for the three comparison processes S4, S8 and S12, a change in the result of identifying the transitional state and the steady state can be suppressed. Therefore, frequent switching of the position control gain and the speed control gain can be suppressed, and thus the EWG valve 1 can be stably controlled.

The present invention is not limited to the above embodiment, and for example the following modifications are considered.

(1) In the above embodiment, the EWG valve 1 (the wastegate valve) is used as the control target valve, but the present invention is not limited thereto. The present invention can be applied to various valves other than the EWG valve 1 (the wastegate valve) in the engine, that is, various flow control valves or on-off valves.

(2) In the above embodiment, in addition to identifying the transitional state and the steady state of the controlled state, the state in which the EWG valve 1 is opened and the state in which the EWG valve 1 is closed are identified, but the present invention is not limited thereto. That is, the identification of the state in which the EWG valve 1 is opened and the state in which the EWG valve 1 is closed may be omitted as needed.

(3) In the above embodiment, the transitional state and the steady state of the controlled state are identified by the three comparison processes S4, S8 and S12, but the present invention is not limited thereto. The transitional state and the steady state may be identified using any one or two of the three comparison processes S4, S8 and S12. The hysteresis set for the three comparison processes S4, S8 and S12 may also be omitted as needed, or it may be set for only the comparison processing S8 that is affected relatively little by noise.

(4) In the above embodiment, the state in which the EWG valve 1 is opened and the state in which the EWG valve 1 is closed are identified on the basis of the comparison processing S14 and the comparison processing S15, but the present invention is not limited thereto. The state in which the EWG valve 1 is opened and the state in which the EWG valve 1 is closed may be identified on the basis of any one of the comparison processing S14 or the comparison processing S15.

REFERENCE SIGNS LIST

1 EWG valve (valve)
2 EWG motor (drive mechanism)
2*a* Lift sensor
3 EWG control unit
3*a* Filter unit
3*b* Control variable converting unit
3*c* Fully closed learning processing unit
3*d* Correcting unit
3*e* Final lift amount setting unit
3*f* Position control unit
3*g* Speed control unit
3*h* DUTY setting unit
3*i* Drive circuit
3*j* Gain setting unit

The invention claimed is:

1. A valve control device configured to perform feedback control of a drive mechanism for a wastegate valve provided for a supercharger of an engine on the basis of a sensor signal indicating a real degree of opening of the wastegate valve and a target degree of opening of the wastegate valve, the valve control device comprising:

a gain setting unit configured to set different control gains when the wastegate valve is closed and when the wastegate valve is opened, wherein the gain setting unit sets the control gain to be relatively large when the wastegate valve is closed, and sets the control gain to be relatively small when the wastegate valve is opened, wherein the gain setting unit sets the control gain to be higher in a transitional section of the target degree of opening when the wastegate valve is closed than in a steady section of the target degree of opening, wherein the gain setting unit determines the steady section and the transitional section in the target degree of opening on the basis of at least one of a deviation between the target degree of opening of the wastegate valve and the real degree of opening thereof and a differential value of the target degree of opening of the wastegate valve, and a differential value of the real degree of opening of the wastegate valve.

2. A valve control device configured to perform feedback control of a drive mechanism for a wastegate valve provided for a supercharger of an engine on the basis of a sensor signal indicating a real degree of opening of the wastegate valve and a target degree of opening of the wastegate valve, the valve control device comprising:

a gain setting unit configured to set different control gains when the wastegate valve is closed and when the wastegate valve is opened, wherein the gain setting unit sets the control gain to be relatively large when the wastegate valve is closed, and sets the control gain to be relatively small when the wastegate valve is opened, wherein the gain setting unit sets the control gain to be higher in a transitional section of the target degree of opening when the wastegate valve is opened than in a steady section of the target degree of opening, wherein the gain setting unit determines the steady section and the transitional section in the target degree of opening on the basis of at least one of a deviation between the target degree of opening of the wastegate valve and the real degree of opening thereof and a differential value of the target degree of opening of the wastegate valve, and a differential value of the real degree of opening of the wastegate valve.

* * * * *